(12) United States Patent
Andrei et al.

(10) Patent No.: US 9,213,740 B2
(45) Date of Patent: Dec. 15, 2015

(54) SYSTEM AND METHODOLOGY FOR AUTOMATIC TUNING OF DATABASE QUERY OPTIMIZER

(75) Inventors: Mihnea Andrei, Issy les Moulineaux (FR); Xun Cheng, Dublin, CA (US); Edwin Anthony Seputis, Oakland, CA (US); Xiao Ming Zhou, Singapore (SG)

(73) Assignee: Sybase, Inc., Dublin, CA (US)

( * ) Notice: Subject to any disclaimer, the term of this patent is extended or adjusted under 35 U.S.C. 154(b) by 1556 days.

(21) Appl. No.: 11/871,022

(22) Filed: Oct. 11, 2007

(65) Prior Publication Data

US 2009/0100004 A1    Apr. 16, 2009

(51) Int. Cl.
 *G06F 17/30* (2006.01)
(52) U.S. Cl.
 CPC .... *G06F 17/30442* (2013.01); *G06F 17/30424* (2013.01); *G06F 17/30463* (2013.01)
(58) Field of Classification Search
 None
 See application file for complete search history.

(56) References Cited

U.S. PATENT DOCUMENTS

| | | | |
|---|---|---|---|
| 6,618,719 B1 * | 9/2003 | Andrei | |
| 2005/0125427 A1 * | 6/2005 | Dageville et al. | 707/100 |
| 2005/0177557 A1 * | 8/2005 | Ziauddin et al. | 707/3 |
| 2008/0215531 A1 * | 9/2008 | Markl et al. | 707/2 |
| 2009/0030888 A1 * | 1/2009 | Sahu et al. | 707/5 |
| 2009/0049012 A1 * | 2/2009 | Bossman et al. | 707/3 |
| 2009/0077017 A1 * | 3/2009 | Belknap et al. | 707/2 |

* cited by examiner

*Primary Examiner* — Mahesh Dwivedi
(74) *Attorney, Agent, or Firm* — Sterne, Kessler, Goldstein & Fox P.L.L.C.

(57) ABSTRACT

System and methodology for automatic tuning of database query optimizer is described. In one embodiment, in a database system having an optimizer for selecting a query plan for executing a database query, a method of the present invention is described for automatically tuning query performance to prevent query performance regression that may occur during upgrade of the database system from a prior version to a new version, the method comprises steps of: in response to receiving a given database query for execution, specifying a query plan generated by the prior version's optimizer as a baseline best plan for executing the given database query; generating at least one new query plan using the new version's optimizer; learning performance for each new query plan generated by recording corresponding query execution metrics; if a given new query plan is observed to have better performance than the best plan previously specified, specifying that given new query plan to be the best plan for executing the given database query; if a given new query plan is observed to have worse performance than the best plan previously specified, specifying that given new query plan to be a bad plan to be avoided in the future; and automatically tuning future execution of the given database query by using the query plan that the system learned was the best plan.

25 Claims, 5 Drawing Sheets

SYSTEM AND METHODOLOGY FOR AUTOMATIC TUNING OF DATABASE QUERY OPTIMIZER

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.
Object Description: SourceCode.txt, size: 32440 Bytes, created: Oct. 11, 2007 2:46:22 PM; Object ID: File No. 1; Object Contents: Source code.

BACKGROUND OF INVENTION

1. Field of the Invention

The present invention relates generally to information processing environments and, more particularly, to a system and methodology for automatically tuning optimization of database queries.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Part I (especially Chapters 1-4), Addison Wesley, 2000.

All database vendors routinely update their products and issue new releases to customers. With each new release, customers of a given database management system can expect significant improvements over prior versions. However, in specific instances the performance may regress (i.e., worsen) over prior versions, especially due to "runaway queries" (i.e., queries for which the database optimizer has selected an inefficient query execution plan). Although a particular customer's motivation for upgrading may be to obtain a new feature (rather than performance improvement), customers also generally expect that performance of the new version of the DBMS should be no worse than the prior version (i.e., no performance regression). For example, customers would be dissuaded from upgrading if significant number of queries were executed less efficiently by the new version when compared to the prior version (i.e., if optimizer plan change regressions occurred). Moreover, after upgrade, as the database state changes, it would be possible for query plan changes to occur and to introduce similar performance regressions.

What is needed is a database system (operating with minimum DBA intervention) that provides methods capable of avoiding runaway queries occurring in new releases (i.e., namely, with an optimizer delivered with a new release) as compared to prior releases. In such a system, the plan chosen by the optimizer should be at least as good as the prior-version optimizer generated plan. Significantly, when the server recognizes a bad (inefficient) plan, the optimizer should know to avoid it at the next time of compilation. The present invention fulfills this and other needs.

SUMMARY OF INVENTION

System and methodology for automatic tuning of database query optimizer is described. In one embodiment, for example, in a database system having an optimizer for selecting a query plan for executing a database query, a method of the present invention is described for automatically tuning query performance to prevent query performance regression that may occur during upgrade of the database system from a prior version to a new version, the method comprises steps of: in response to receiving a given database query for execution, specifying a query plan generated by the prior version's optimizer as a baseline best plan for executing the given database query; generating at least one new query plan using the new version's optimizer; learning performance for each new query plan generated by recording corresponding query execution metrics; if a given new query plan is observed to have better performance than the best plan previously specified, specifying that given new query plan to be the best plan for executing the given database query; if a given new query plan is observed to have worse performance than the best plan previously specified, specifying that given new query plan to be a bad plan to be avoided in the future; and automatically tuning future execution of the given database query by using the query plan that the system learned was the best plan.

In another embodiment, for example, a database system of the present invention having an automatically tuning optimizer for selecting a query plan for executing a database query such that query performance regression is avoided during upgrade of the database system from a prior version to a new version is described that comprises: a query plan generated by the prior version's optimizer, which serves as a baseline best plan for executing a given database query; at least one new query plan generated by the new version's optimizer; a learning object associated with each query plan for tracking corresponding query execution metrics, whereby the system may learn which new query plan, if any, is the best plan for executing the given database query and which new query plans are bad plans to be avoided in the future; and a module for automatically tuning future execution of the given database query, based on which query plan the system learned was the best plan.

In yet another embodiment, for example, in a database system having an optimizer for selecting a query plan for executing a database query, a method of the present invention is described for tuning query performance to prevent query performance regression, the method comprises steps of: establishing a baseline best plan for executing the database query; generating a new query plan for executing the database query; if the new query plan has not been previously identified as a bad plan, monitoring performance of the new query plan; if the new query plan has better performance than the best plan previously established, establishing the new query plan to be the best plan for executing the given database query; if the new query plan does not have better performance than the best plan previously established, establishing the new query plan to be a bad plan; and performing subsequent executions of the database query using the query plan that the system established was the best plan.

DETAILED DESCRIPTION

Glossary

The following definitions are offered for purposes of illustration, not limitation, in order to assist with understanding the discussion that follows.

Abstract Plan: A relational algebra describing the query execution plan of a SQL query.

Auto Query Tuning: Optimization techniques of the present invention which serve to prevent performance regressions resulting from changes to plans for executing database queries.

DBMS: DBMS stands for database management system.

QEP or Query Execution Plan: A server engine specific data structure created by the code generation module of the DBMS based on the outcome of the optimization of a database query and which directs the processing of the query in the execution module of the DBMS.

Learning object: A "learning object," which is implemented internally as a new class, represents a collection that includes an abstract plan together with query metrics (i.e., execution time metrics on the behavior of previous executions of the query plan) for several different plans. The underlying query text itself (i.e., SQL query), with a user ID when necessary, is used to associate each learning object with a particular query. In other words, the query text string uniquely identifies a particular learning object from other learning objects.

Relational database: A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. The standard user and application program interface to a relational database is the structured query language (SQL), defined below.

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 9075-(1-5)-1999 (formerly ANSI/ISO/IEC 9075-(1-5) 1999), the disclosure of which is hereby incorporated by reference.

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic System Hardware and Software (e.g., for Desktop and Server Computers)

Figure 1:
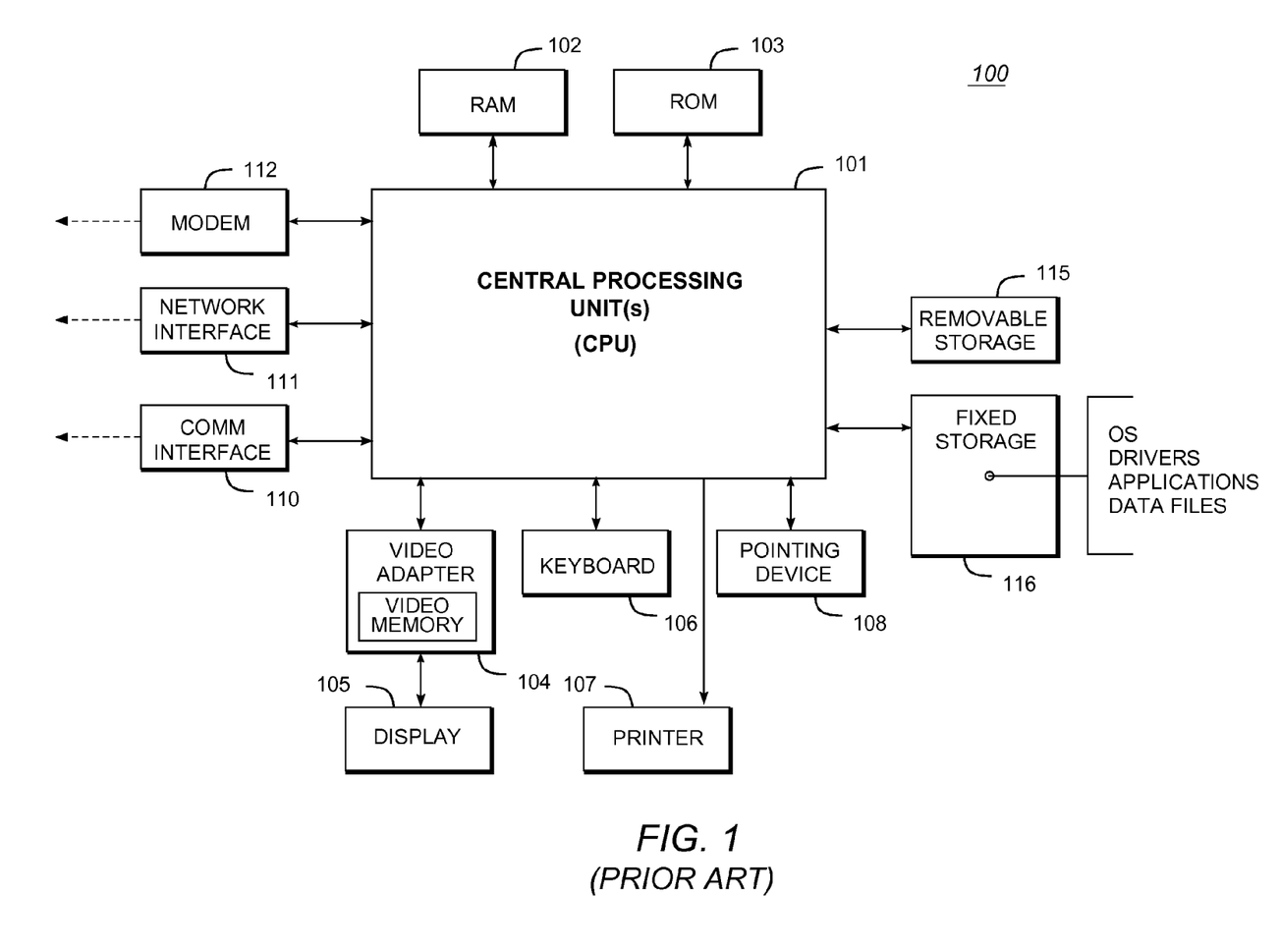
FIG. 1 is a very general block diagram of a computer system (e.g., an IBM-compatible system) in which software-implemented processes of the present invention may be embodied.

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

A software system is typically provided for controlling the operation of the computer system 100. The software system, which is usually stored in system memory (RAM) 102 and on fixed storage (e.g., hard disk) 116, includes a kernel or operating system (OS) which manages low-level aspects of computer operation, including managing execution of processes, memory allocation, file input and output (I/O), and device I/O. The OS can be provided by a conventional operating system, Microsoft Windows NT, Microsoft Windows 2000, Microsoft Windows XP, or Microsoft Windows Vista (Microsoft Corporation of Redmond, Wash.) or an alternative operating system, such as the previously mentioned operating systems. Typically, the OS operates in conjunction with device drivers (e.g., "Winsock" driver—Windows' implementation of a TCP/IP stack) and the system BIOS microcode (i.e., ROM-based microcode), particularly when interfacing with peripheral devices. One or more application(s), such as client application software or "programs" (i.e., set of processor-executable instructions), may also be provided for execution by the computer system 100. The application(s) or other software intended for use on the computer system may be "loaded" into memory 102 from fixed storage 116 or may be downloaded from an Internet location (e.g., Web server). A graphical user interface (GUI) is generally provided for receiving user commands and data in a graphical (e.g., "point-and-click") fashion. These inputs, in turn, may be acted upon by the computer system in accordance with instructions from OS and/or application(s). The graphical user interface also serves to display the results of operation from the OS and application(s).

Client-Server Database Management System

Figure 2:
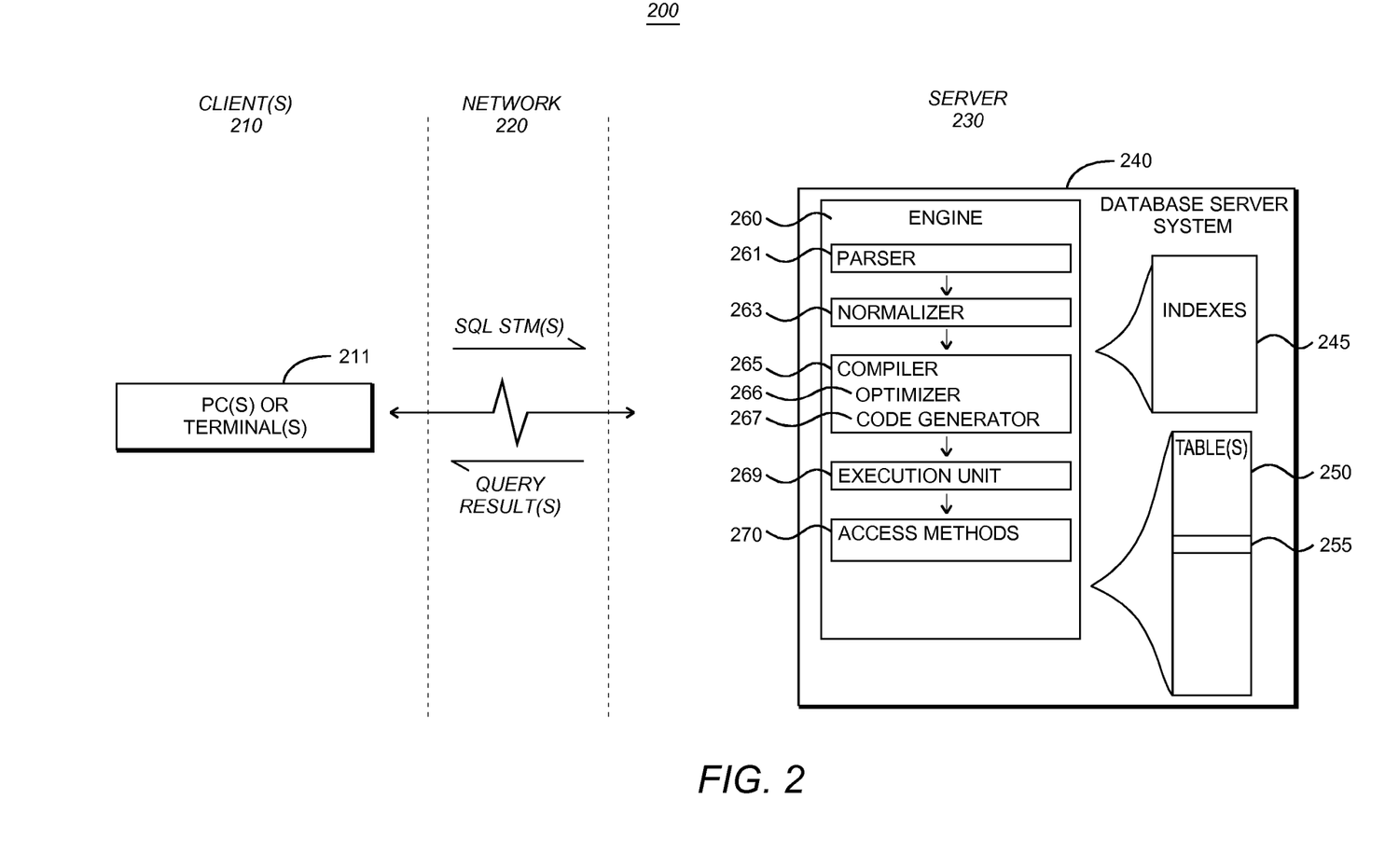
FIG. 2 illustrates the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 2 illustrates the general structure of a client/server database system 200 suitable for implementing the present invention. (Specific modifications to the system 200 for implementing methodologies of the present invention are described in subsequent sections below.) As shown, the system 200 comprises one or more client(s) 210 connected to a server 230 via a network 220. Specifically, the client(s) 210 comprise one or more standalone terminals 211 connected to a database server system 240 using a conventional network. In an exemplary embodiment, the terminals 211 may themselves comprise a plurality of standalone workstations, dumb terminals, or the like, or comprise personal computers (PCs) such as the above-described system 100. Typically, such units would operate under a client operating system, such as a Microsoft® Windows client operating system (e.g., Microsoft® Windows 2000, Windows XP, or Windows Vista).

The database server system 240, which comprises Sybase® Adaptive Server® Enterprise (available from Sybase, Inc. of Dublin, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, Wash.), UNIX (Novell), Solaris (Sun), or Linux (Red Hat). The network 220 may be any one of a number of conventional network systems, including a Local Area Network (LAN) or Wide Area Network (WAN), as is known in the art (e.g., using Ethernet, IBM Token Ring, or the like). The network 220 includes functionality for packaging client calls in the well-known Structured Query Language (SQL) together with any parameter information into a format (of one or more packets) suitable for transmission to the database server system 240.

Client/server environments, database servers, and networks are well documented in the technical, trade, and patent literature. For a description of Sybase® Adaptive Server® Enterprise, see, e.g., "Adaptive Server Enterprise 15.0 Collection: (1) Core Documentation Set and (2) Installation and Configuration," available from Sybase, Inc. of Dublin, Calif. This product documentation is available via the Internet (e.g., currently at sybooks.sybase.com). The disclosures of the foregoing are hereby incorporated by reference.

In operation, the client(s) 210 store data in, or retrieve data from, one or more database tables 250, as shown at FIG. 2. Data in a relational database is stored as a series of tables, also called relations. Typically resident on the server 230, each table itself comprises one or more "rows" or "records" (tuples) (e.g., row 255 as shown at FIG. 2). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number, and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. The syntax of SQL is well documented; see, e.g., the above-mentioned "An Introduction to Database Systems". SQL statements may be divided into two categories: data manipulation language (DML), used to read and write data; and data definition language (DDL), used to describe data and maintain the database. DML statements are also called queries. In operation, for example, the clients 210 issue one or more SQL commands to the server 230. SQL commands may specify, for instance, a query for retrieving particular data (i.e., data records meeting the query condition) from the database table(s) 250. In addition to retrieving the data from database server table(s) 250, the clients 210 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 210 (via network 220) are processed by the engine 260 of the database server system 240. The engine 260 itself comprises a parser 261, a normalizer 263, a compiler 265, an execution unit 269, and an access methods 270. Specifically, the SQL statements are passed to the parser 261 which converts the statements into a query tree—a binary tree data structure which represents the components of the query in a format selected for the convenience of the system. In this regard, the parser 261 employs conventional parsing methodology (e.g., recursive descent parsing).

The query tree is normalized by the normalizer 263. Normalization includes, for example, the elimination of redundant data. Additionally, the normalizer 263 performs error checking, such as confirming that table names and column names which appear in the query are valid (e.g., are available and belong together). Finally, the normalizer 263 can also look-up any referential integrity constraints which exist and add those to the query.

After normalization, the query tree is passed to the compiler 265, which includes an optimizer 266 and a code generator 267. The optimizer 266 is responsible for optimizing the query tree. The optimizer 266 performs a cost-based analysis for formulating a query execution plan. The optimizer will, for instance, select the join order of tables (e.g., when working with more than one table), and will select relevant indexes (e.g., when indexes are available). The optimizer, therefore, performs an analysis of the query and selects the best execution plan, which in turn results in particular access methods being invoked during query execution. It is possible that a given query may be answered by tens of thousands of access plans with widely varying cost characteristics. Therefore, the optimizer must efficiently select an access plan that is reasonably close to an optimal plan. The code generator 267 translates the query execution plan selected by the query optimizer 266 into executable form for execution by the execution unit 269 using the access methods 270.

All data in a typical relational database system is stored in pages on a secondary storage device, usually a hard disk. Typically, these pages may range in size from 1 Kb to 32 Kb, with the most common page sizes being 2 Kb and 4 Kb. All input/output operations (I/O) against secondary storage are done in page-sized units—that is, the entire page is read/written at once. Pages are also allocated for one purpose at a time: a database page may be used to store table data or used for virtual memory, but it will not be used for both. The memory in which pages that have been read from disk reside is called the cache or buffer pool.

I/O to and from the disk tends to be the most costly operation in executing a query. This is due to the latency associated with the physical media, in comparison with the relatively low latency of main memory (e.g., RAM). Query performance can thus be increased by reducing the number of I/O operations that must be completed. This can be done by using data structures and algorithms that maximize the use of pages that are known to reside in the cache. Alternatively, it can be done by being more selective about what pages are loaded into the cache in the first place. An additional consideration with respect to I/O is whether it is sequential or random. Due to the construction of hard disks, sequential I/O is much faster then random access I/O. Data structures and algorithms encouraging the use of sequential I/O can realize greater performance.

For enhancing the storage, retrieval, and processing of data records, the server 230 maintains one or more database indexes 245 on the database tables 250. Indexes 245 can be created on columns or groups of columns in a table. Such an index allows the page containing rows that match a certain condition imposed on the index columns to be quickly located on disk, rather than requiring the engine to scan all pages in a table to find rows that fulfill some property, thus facilitating quick access to the data records of interest. Indexes are especially useful when satisfying equality and range predicates in queries (e.g., a column is greater than or equal to a value) and "order by" clauses (e.g., show all results in alphabetical order by a given column).

A database index allows the records of a table to be organized in many different ways, depending on a particular user's needs. An index key value is a data quantity composed of one or more fields from a record which are used to arrange (logically) the database file records by some desired order (index expression). Here, the column or columns on which an index is created form the key for that index. An index may be constructed as a single disk file storing index key values together with unique record numbers. The record numbers are unique pointers to the actual storage location of each record in the database file.

Indexes are usually implemented as multi-level tree structures, typically maintained as a B-Tree data structure. Pointers to rows are usually stored in the leaf nodes of the tree, so an index scan may entail reading several pages before reaching the row. In some cases, a leaf node may contain the data record itself. Depending on the data being indexed and the nature of the data being stored, a given key may or may not be intrinsically unique. A key that is not intrinsically unique can be made unique by appending a RID (disk address "Row ID"). This is done for all non-unique indexes to simplify the code for index access. The traversal of an index in search of a particular row is called a probe of the index. The traversal of an index in search of a group of rows fulfilling some condition is called a scan of the index. Index scans frequently look for rows fulfilling equality or inequality conditions; for example, an index scan would be used to find all rows that begin with the letter "A".

The above-described computer hardware and software are presented for purposes of illustrating the basic underlying computer components (e.g., database server) that may be employed for implementing the present invention. For purposes of discussion, the following description will present examples in which it will be assumed that there exists a "server" (e.g., database server) for purposes of implementing the processes described below. In typical operation, such a server communicates with one or more other computers, including "clients" (e.g., customer or end-user computers that are "database clients" of the server). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview of Automatic Tuning of the Database Query Optimizer

Customers upgrading their database software generally expect queries to be processed by the upgraded DBMS no less efficiently than with the version before the upgrade. This means that the query execution plan chosen by the database optimizer in the upgraded release must be at least as good as the plan generated for the same query by the prior optimizer (i.e., the optimizer of the version before the upgrade). Of particular interest to the present invention is the avoidance of runaway queries in the context of a database software upgrade as this can cause customers dissatisfaction and may, in fact, lead customers to avoid implementation of the upgrade. The present invention provides a solution which enables such performance regressions to be avoided. The optimizer of the present invention uses the best plan generated by the prior version of the optimizer (when available) as a baseline. New plans generated by the new optimizer generally must perform better than this baseline in order to be retained and used for future query. The optimizer of the present invention also learns to recognize "bad" (i.e., inefficient) plans, so that such plans can be avoided (e.g., at compilation). The present invention enables the pain point of a version upgrade to deferred (and thereby defer any needed performance analysis), while providing acceptable performance of legacy plans.

The solution leverages Sybase's (i.e., present assignee's) unique Abstract Plan technology to provide information to the optimizer to enable it to make better optimization decisions. This Abstract Plan feature comprises a language interface to the optimizer through which the optimizer can be given a description of a query execution plan (QEP). Once an Abstract Plan (AP) expression is applied to a statement's optimization, the resulting QEP is compliant to the given AP. Abstract Plans are relational algebra expressions that are not syntactically included in the query text. Instead, Abstract Plans are stored (e.g., in a system catalog) and associated with incoming queries based on the text of these incoming queries. Thus, Abstract Plans overcome the shortcomings of forced options, by offering fine-grained description capability and not requiring statement text modification. For further description of Abstract Plans see, e.g., U.S. Pat. No. 6,618,719 titled "Database System with Methodology for Reusing Cost-Based Optimization Decisions", the disclosure of which is hereby incorporated by reference.

Database customers have previously requested the ability to turn certain product features "on" or "off", so as to suit their particular needs. For example, customers of Oracle database software can turn on a "rule-based" optimizer, and turn off the Oracle cost-based optimizer. Similarly, customers of Sybase database software desire the ability to turn on a prior version's optimizer (e.g., customers of Sybase ASE 15.0 wish to "turn on the ASE 12.5.4 optimizer"). The reason customers desire this functionality is that the addition of new access paths (i.e., brought on by an upgraded optimizer) takes significant efforts and time to stabilize. For example, the database vendor Informix (now part of IBM) had difficulty with optimizer decisions when the merge join operator was introduced. As another example, Oracle still has issues with plan selection involving hash operators. Oracle has a feature called "plan stability" but which is not as organized or flexible as Abstract Plans, where (apparently) legacy plan hints are used to capture the essence of the plan but not fully specify the plan. In accordance with the present invention, the database software automates the process by which customers resolve performance issues, namely, by having the database optimizer learn which plans are good (and are to be retained) and which plans are bad (and are to be avoided), and does so with the least possible use of resources and DBA intervention. This "auto query tuning" approach reduces the pain point of upgrade by providing a baseline level of performance comparable to that experienced prior to the upgrade and then automatically tuning itself to obtain the benefit of plans generated by the new optimizer which prove to be advantageous.

In the currently preferred embodiment, two basic modes are used:

Legacy primed plan generation mode (legacy mode): Here, the optimizer of the present invention employs methodologies/algorithms similar to the legacy (i.e., prior release) optimizer for code generation and execution. In this mode, the optimizer attempts to generate and use query execution plans similar to those generated by the prior optimizer, to the extent feasible. However, if new optimizer features are used, then it may not be possible to use similar legacy algorithms in all instances. Accordingly, there is no guarantee that the similar algorithms will produce an identical query plan to a prior release.

Auto query tuning mode: Here, the optimizer operates in a new "Abstract Plan capture mode" which captures all new plans (i.e., any query plan which has not been previously associated with the query) and their associated query metrics. If a given new plan has better performance than the previous best plan, then this new plan is marked as the new best plan. For example, the previous best plan may be a plan which was generated based on the prior version of the optimizer (e.g., as described in the above legacy mode). The new optimizer may identify a new plan which it believes will have better performance than this plan. During this mode, metrics are tracked as the new plan is executed to determine if it does, in fact, provide improved performance. The metrics are employed to make decisions. When a new plan is executed, it has the potential for severe regression. If the new plan has poorer performance than the best plan previously identified, then it is marked as one of possibly several bad plans. Metrics about the plan are also retained so that without intervention from the customer, the plan may be avoided on subsequent executions. During auto query tuning mode, if the optimizer chooses a new plan which has been previously seen and which is marked as one of the bad plans, then the solution will instead execute the current best Abstract Plan (i.e., one marked as having the best metrics). In addition to retaining information about the best plan that has been discovered during this auto query tuning mode, "bad learning" Abstract Plans are also retained as hereinafter described so that the optimizer learns to avoid bad (i.e., inefficient) plans in the future.

The first time a query is issued for compilation, the optimizer will use the legacy primed (e.g., ASE 12.5) plan generation to get the pre-upgrade (e.g., pre-ASE 15.0) optimizer plan and query metrics to establish a baseline. This initial invocation of auto query tuning mode will only capture plans and metrics as produced by the legacy algorithms where possible. After that, the optimizer uses the newer algorithms to improve the baseline. At the beginning of the search, if there is an existing best learning Abstract Plan (AP), this AP is used to prime the search engine with a full plan. This full plan is pinned to the optimizer search space plan cache and never discarded. At the end of the compilation, the final plan is compared with any bad learning AP(s). If a match is found, the final plan is ignored as it is recognized as an inefficient (i.e., bad) plan. In this case, the pinned full plan for the current best learning AP is used as instead of the final plan for executing the query. At the end of the execution of the final plan or when the execution is aborted, the final plan is labeled as a learning AP (e.g., a best learning AP or a bad learning AP) based on the metrics.

Implementation of Modes

The following description will focus on modifications made to the upgraded database system (e.g., commercial embodiment of Sybase ASE) for implementing the two query processing modes. For purposes of discussion, the real-world database system of Sybase ASE 15.0 will be used as the upgrade (new) database system, and Sybase ASE 12.5 (more specifically, ASE 12.5.4) will be used as the prior (legacy) database system. Although the discussion will use the specific commercial releases as examples, those skilled in the art will appreciate that the approach of the present invention may be advantageously applied to comparable systems, and that implementation of the present invention is not limited to specific versions of database software. Although most performance regressions occur during upgrade, the present invention also applies after a successful upgrade, in which the database state changes sufficiently to cause new query plans to be chosen, which could result in bad query plans that could be automatically avoided by the present invention. In prior art, systems would use feedback optimization to attempt to find new better query plans, but this innovation is uniquely focused on feedback to automatically avoid bad query plans as database state changes.

Legacy Primed Plan Generation Mode (Legacy Mode)

1. General

Legacy primed plan generation mode or simply "legacy mode" instructs query processing to use the prior version (e.g., ASE 12.5.4) optimizer for initial plan selection for all queries in which only pre-upgrade (e.g., ASE pre-15.0) features are used. The initial plan is then used to force the current release optimizer search engine to choose the same legacy plan. If any new 15.0 or later features are used in the query, then only the 15.0 optimizer will be used for that query (i.e., the prior version optimizer will not be used). This legacy mode feature is designed to provide the 12.5 plan (i.e., plan generated by the old version of the optimizer prior to the upgrade) as an established baseline of performance. One potential caveat is that if a user upgrades an earlier version (e.g., a version prior to 12.5, such as version 12.0, version 11.9.2 etc.), there is an increased likelihood of some performance regressions when using legacy mode. A reason for this, for example, is that there will likely have been optimizer code differences with versions prior to 12.5.4 that will not be tracked by the legacy mode functionality.

With the legacy mode, the desired behavior is to not only have legacy plan selection but also to have close to legacy compile time resource consumption in both procedure cache usage and optimization time. A slight increase in both memory and time consumption compared to pre-15.0 versions may result, since although the legacy optimizer code path is used, the output of this will be an Abstract Plan, which is fed into the new optimizer as the plan to use for generation of the query execution plan. The new optimizer is simply used for plan validation and code generation, but the validation and code generation process will consume an incremental amount of resource over pre-15.0 query optimization. However, this incremental amount is much less than the resources required for a full optimization of the query using the new (15.0) optimizer.

Legacy mode will take priority over newer 15.0 features wherever possible, such as with the set commands. Thus, if nested loop joins are disabled by a set command, then legacy mode will override (i.e., ignore) this pragma. Pre-15.0 (i.e., legacy) configuration parameters, legacy trace options, legacy force options, and legacy set commands that affect the old optimizer are recognized in legacy mode. Features such as sort-merge join and transitive closure are used in the legacy optimizer code path. However, legacy mode does not imply that the legacy code generation and execution engine will be used, and this may result in some performance differences which are not query plan specific. For example, for a merge join, the legacy engine would be able to rescan an inner set of duplicates keys by accessing the data pages directly, whereas this access method is not available in the new execution engine (the new engine merge join will buffer any run of duplicates and only scan the inner subplan once).

Any Abstract Plan specification overrides the legacy mode path and goes directly to the 15.0 optimizer. The caveat with this simplification is that legacy partial plans will not pass through the legacy optimizer, and this could result in a plan change after upgrade. However, experience to date indicates that due to the usability issues with Abstract Plans few, if any, partial plans exist. The vastly more common case is the usage of legacy FROM clause hints versus legacy partial Abstract Plans. If only legacy FROM clause hints are used, then the legacy optimizer path is used in legacy mode. If there is a failure in the legacy optimizer, even an internal exception, then query processing recovers and uses the 15.0 optimizer. In all cases in which the legacy optimizer could not be used, a message is printed as part of the search engine tracing. The legacy Abstract Plans are captured, along with the metrics into a "sysqueryplan" data structure to serve as the baseline of performance.

2. Abstract Plan Partial Hints

Auto query tuning takes advantage of the existing Abstract Plan behavior in regards to partial hints. The "plan" clause is removed from the query text so that any association with between the query text and a learning object will be only on the remaining text of the query. However, if legacy hints appear in the FROM clause, then the legacy hint text is not removed from the query for association, which means it would not be recognized as the same learning object as one which is hint-free.

A partial hint may be ignored, in the case that the eventual plan that was generated included the partial hint that was matched to a bad query plan. The auto query tuning rule to avoid bad query plans takes precedence over partial hints. Here, the good query plan of the learning object will be used instead of the bad plan. However, if the query plan generated is not a bad plan, then it will be executed and placed into training mode. Thus, there are different considerations with cases with "force" options:

(1) Force options are ignored because it resulted in a plan that was marked as bad in the learning object, and instead the learning object best plan is used (2) Force options are used in the query plan, and that plan is used either because it is the current best plan, or it is a plan in training 3. Manually Activate Legacy Mode at Session Level In the currently preferred embodiment, the following SET command is introduced to manually activate legacy mode so as to use the pre-15.0 optimizer for plan generation:
set basic_optimization on/off If desired, the user can use the SET command to manually activate the legacy mode. The SET command applies to all queries compiled by the current session, but does not recompile queries looked up in the statement cache or stored procedures which are already cached. Under auto query tuning mode, this SET command only applies to all queries the first-time compiled by this session since the issuing of the SET command. The default behavior is "off" (i.e., the server will choose whether to activate legacy mode for a query automatically).

Auto Query Tuning Mode

The auto query tuning mode automates the user tasks needed to solve a performance regression. In prior art systems, a query performance regression issue is typically resolved by isolating the query causing the problem, finding the previous query plan that had desirable performance, and then causing the optimizer to choose the desirable query plan in some way. Enabling auto query tuning results in a variant of the Abstract Plan capture mode being used and a variant of load plan mode being used, and query metrics being gathered. "Sysqueryplans" (an internal persistent system catalog) uses the actual text of the query as a lookup key, to associate the best query plan, as well as any poorer plans that may have had better estimates but poor actual behavior based on metrics (referred to as "bad learning" plans) with a given query. The behavior is to prime the search engine with any existing best Abstract Plan (e.g., generated based on a plan from a prior version of the optimizer), but still go into a full optimization in an attempt to find a better plan. If a new query plan is found which the optimizer believes may provide better performance than the best plan previously identified, then the new plan is checked against the set of bad plans. If the new query plan matches a bad plan, then the current best Abstract Plan is used as the basis for executing the query. For example, a plan generated by the 12.5 optimizer may be used if the new query plan generated by the 15.0 optimizer is found to match a bad plan (i.e., a plan determined to be inefficient based on the collected metrics). If the query plan is totally new (i.e., has not been seen before), then it is executed. Here, the sysqueryplans is updated by storing the new query plan and the respective metrics, and by marking the plan as the new best plan (relabeling the previous best plan as a bad plan) or marking the plan as a bad plan. The marking of good and bad plans is done implicitly by dynamically determining on a subsequent optimization the best plan, based on current metrics (such as elapsed time).

The minimum elapsed time metric is used to distinguish between good and bad plans. Metrics are recorded that are associated with each query plan, both good and bad, in sysqueryplans. It should be noted that this does not interfere with the aggregated metrics for all instances associated with the query (i.e., upon request, aggregated metrics should still accumulate for all executions of the query).

Under query tuning mode, the first plan could be the plan from the legacy mode and is labeled as the initial best plan. In other words, the optimizer uses the legacy mode automatically so that the best plan can be primed in sysqueryplans and then effectively turns off legacy mode so that the learning optimizer can attempt to find better plans for execution of the query. Accordingly, a legacy plan from a prior version of the optimizer is only replaced by a new plan(s) generated by the new optimizer which is found to be more efficient based on the collected metrics (e.g., execution time).

1. Auto Query Tuning Mode, AP Mode and Metrics Mode

For auto query tuning, the optimizer uses sysqueryplans to store the following categories of items:
pure APs, as before
pure metrics, as before
for the new auto query tuning mode, a more complex item, the learning object, holds both APs and metrics.

If there is an explicit AP plan specified for the query by the user, the final plan of the AP could still be discarded if it is already a bad plan labeled by the learning optimizer for the query. If the "plan off" clause is used for the query, the auto query tuning mode will be off for this particular query instance.

(a) AP LOAD ON, AUTO QUERY TUNING OFF

If the Abstract Plan exists, then the system uses it under this setting. If the Abstract Plan does not exist but the learning object does exist, then the system uses the best plan from the learning object. The usage scenario is to use auto query tuning to find query plans with good performance. Capturing metrics can potentially be too expensive for a production database, so loading Abstract Plans takes advantage of existing learning objects without the continued performance hit of capturing metrics. If any new queries that do not have learning objects are optimized, then the system just optimizes normally without learning (i.e., auto query tuning) in this setting.

(b) AP LOAD ON, AUTO QUERY TUNING ON

If an Abstract Plan exists, then it is used to prime a learning object (if one does not exist) and update the metrics of the respective plan in the learning object. If Abstract Plans are saved in ASE 12.5 format, for example, and an upgrade occurs, there needs to be a way to create a baseline for auto query tuning from the saved Abstract Plans. Once the learning object is primed with the Abstract Plan, then the original Abstract Plan entry will be deleted. If both an Abstract Plan and a learning object exist, then the system applies the same rules as if a "plan" phrase was used and checks for an existing learning entry for the Abstract Plan. Otherwise, the system creates a training entry for the current plan. Once the training is complete, the Abstract Plan entry is dropped. If an Abstract Plan does not exist, then auto query tuning behaves as before. If the plan created by the Abstract Plan has been determined to be a bad plan, then the current best plan of the learning object will be used instead. This highlights that the best query plan will be used by the learning object in all cases, except those in which a plan is still in training.

(c) PLAN PHRASE, AUTO QUERY TUNING ON

The plan phrase is applied to the query and overrides any existing saved Abstract Plan. However, the interaction with a learning object is similar to the foregoing AP LOAD ON, AUTO QUERY TUNING ON. If the learning object exists, the system checks for an entry for the Abstract Plan; otherwise, it creates a training entry for the Abstract Plan. If the plan created by the plan phrase is a bad plan, then the current best plan of the learning object will be used instead.

2. Showplan Changes

Auto query tuning could cause a merge join to be used even though merge join has been turned off by the session. The usage scenario is that one is allowed to cycle thru the various criteria and/or "optgoals" to find the best baseline. Therefore, Showplan is enhanced to show:
1. nothing (new plan was found in the search space)
2. abstract plan used (which is done already)
3. auto query tuned plan used instead of a bad plan (i.e., the bad plan had the better estimate, but execution metrics rejected the plan)
4. auto query tuned plan used (no new plan found)
5. statement cache plan used 3. Learning and Candidate Plans Other external factors may cause considerable variation in costs of execution of the same query plan at different times. For instance, system load and literals factoring can result in different actual costs for several executions of the same plan. Accordingly, the approach of the present invention is to capture query-processing (QP) metrics that reveal maximum/average/minimum aggregation across several executions of a query plan. This is done as it is generally desirable to base the auto query tuning mode decisions on the aggregated metrics of several executions rather than making a decision based on the actual costs of a single execution. For the metrics of the best AP, the one used to prime the search engine, one naturally gets aggregation: as long as it is retained as the best AP, metrics from each execution of the plan would be accumulated.

Empirical evidence has shown 10 buffering can occur at various levels that may dramatically influence response time:
1. Buffering in the data manager buffer cache
2. Buffering in the file system cache
3. Buffering on the I/O controller of BMC, NETAPP For buffering in the data manager cache, the difference in PIO (Physical I/O) can distinguish between a cold and warm run. The other caching is difficult to measure, but the end result is that a false negative can occur when the performance of a plan is evaluated based on only one instance of its execution. Thus, care should be taken about the metrics of suboptimal plans: if one deems an AP as being bad on the first execution that had an actual execution cost worse than the execution costs of some other plan, then one effectively bases the decision on a single-event training set. Such an approach would not use the full strength of the metrics mechanism. Therefore, the preferred approach of the present invention is to keep a plan for several executions and aggregate its metrics before basing a decision as to whether or not the plan has favorable or unfavorable execution costs. Until the plan has been executed several times and a decision made about whether or not it yields the best results, such an AP is not discarded, nor does it cause other APs to be discarded; thus, there could be several APs in this candidate mode.

Accordingly, the learning item (object) associated with a query may contain not only the best AP and bad AP(s) (with their metrics) but also a set of candidate APs. When a given optimizer estimated best plan is executed the first time, its AP is included in the candidate section of its query's learning item. For the first n executions of this plan (potentially non-adjacent, whenever the optimizer chooses the plan as the cheapest one), the metrics are accumulated but no decision is yet based on them. Once n is reached, the system starts basing learning decisions on this AP. The initial best plan from the legacy mode could be an exception and does not need to go through this candidate phase. The "n" can be configured by a user using the following stored procedure syntax:

sp_configure "query tuning plan executions", n

The configuration value (n) determines how many times a learning AP plan is executed in the candidate mode before being labeled as based on its aggregated metrics (i.e., labeled as a "bad" plan or as the best plan). The default configuration value is 3. If the execution of the best learning AP subsequently performs more poorly (e.g., 20% worse than its previous aggregated metrics) or even becomes invalid (e.g., if it relies on an index that was dropped), all learning APs for the query are immediately moved to back into candidate mode.

When the "query tuning plan executions" (i.e., the above configuration value n) is greater than 1, a threshold is introduced as some amount of elapsed time proportional to the number of joining relations. If the current best learning AP plan is within the threshold, there will be only best learning AP and bad learning APs for the query and the system does not go through any candidate phase for the query. Also, if a query plan's particular execution instance has a much better/worse (10 fold) metrics compared to the current best plan, such plan is exempted from candidate phase and is immediately labeled as a best or bad AP.

As discussed herein, a query holds its own learning item (best AP, bad APs and candidate APs). The query is identified by its query text (possibly after literal parameterization), userid (the userid could be 0) issuing the query and any session setups that could affect query semantics. Userid 0 is used when all tables in the query are either owned by the DBO, or has the user name explicitly prefixed, so that any user executing this query text will reference the same underlying tables. Using userid 0 is intended to increase sharing among different sessions and reduce sysqueryplans catalog bloat. Literal parameterization is turned on automatically with auto query tuning; in order to reduce sysqueryplans catalog bloat. Those session setups have been captured by a ssql_lookup( ) function in the statement cache module (ssql_lookup( ) is actually based on more items including those not affecting query semantics).

Following are items affecting query semantics:

Isolation level: The isolation level is currently handled by a "must recompile" function (s_mustrecompile) so that if the same query text is executed in the context of different isolation levels, the behavior should be to recompile. It is conceivable, but unlikely that the same Abstract Plan could be created in context of one isolation level, but used in another isolation level. A plan may be forced with "legacy force" options to override the special optimizer handling of dirty reads, so part of the definition of the feature would be that Abstract Plans would override this as well. The problem being that if isolation is changed to correct a transactional behavior, then it becomes difficult to change the previous Abstract Plans that were created under another isolation level. If this becomes an issue, it would be worthwhile to store the "isolation level" along with Abstract Plans.

Delimited identifier behavior: This behavior could affect the semantics of a query in the odd cases that two sessions execute the same query text, with different delimited identifier settings. If this becomes an issue, it would be worthwhile to save the delimited identifier state along with Abstract Plans.

It would be appropriate to attempt to have a consistent behavior between the query processing features that use text association, i.e., statement cache, Abstract Plans, query metrics and dynamic SQL cache.

4. Reducing the Size of Learning APs

It is necessary to limit the number of APs that can be part of the candidate and bad learning AP sections. In most applications, the bad plans and good plans are relatively stable (i.e., with respect to the optimization goal being used). Thus for each query, the currently preferred embodiment allows at most five different learning APs in the bad learning AP list and at most six in the candidate set. (Those skilled in the art will appreciate that the actual maximum number of learning APs in the list and the actual maximum number in the candidate set can vary depending on the particular environment and deployment contemplated.) The rationale is that during a particular setup, the optimizer could possibly pick one bad plan for each "optgoal" (three of them), one from legacy mode and another one allowing user to use AP/hints to force the plan. The mechanism can be fine-tuned based on observed test results, with the corrective action being the introduction of more configuration parameters and/or that a query that has a very large number of differing plans is not a candidate for auto query tuning and the behavior will revert to be much like the "must recompile" feature associated with stored procedures, in which re-optimization is desirable for every execution of the query. When no more space is left to hold a new learning AP, the candidate or bad learning AP for the same query is discarded based on LRU rule, i.e., least recently used prune out of APs from the candidate or bad sections that have relatively few "encounters".

5. The Learning AP State Transition

Figure 3:
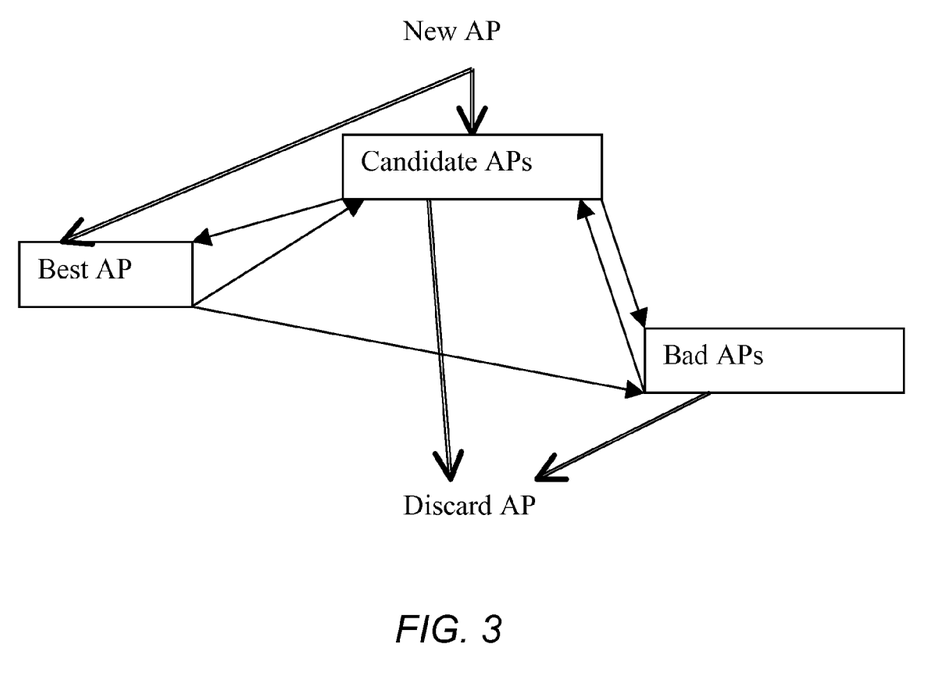
FIG. 3 is a block diagram showing how a particular learning Abstract Plan (AP) can change its status under auto query tuning mode.

FIG. 3 is a block diagram showing how a particular learning AP can change its status under auto query tuning mode. The transitions are as follows:

New AP→candidate APs: always, except for the first learning AP coming from the basic_optimization plan generation which is immediately moved to the Best AP as the initial baseline performing plan;

Candidate APs→best AP: completed candidate plan, metrics cheaper than the current best AP's;

Candidate APs→bad APs: completed candidate plan, metrics worse than the current best AP's;

Candidate APs→discard AP: did not complete the candidate phase but has relatively few executions with respect to its peers, removed due to LRU rule;

Best AP→bad APs: a candidate AP has better metrics, it becomes the new best AP and the current best AP becomes bad AP;

Best AP→candidate APs: the best AP is not valid anymore. Or the best AP is performing 20% worse than its previous aggregated metrics;

Bad APs→candidate APs: no known best AP (due to, e.g., a deleted index), all bad APs are moved back to candidate APs;

Bad APs→discard AP: removed due to LRU rule from the bad AP list.

6. Invalidating (Part of) the Learning AP

There are changes that could invalidate all or part of the learning AP and must therefore be taken into account. The learning AP item contains several AP+metrics pairs: the best one, the candidate ones, the bad ones. This historical information is very important to the status of the learning optimizer as part of the auto query tuning. One should thus avoid discarding any such information that is still valid.

The potential causes are related to what could cause actual/estimated cost changes:

cost model/plan enumeration change;

execution engine/access methods changes;

data set change;

schema change.

The cost model or the plans enumeration could change when a different ASE version is installed, due to optimizer code changes, either bug fixes or enhancements. As long as one does not aggregate/store/use the estimated costs with the learning AP (only handle metrics, i.e., actual costs, are stored), there is nothing to invalidate.

A different scenario occurs when the new version includes changes to the execution engine or access methods. Better algorithms could make some APs cheaper whereas regressions (or consequences of trade-offs) could make other APs more expensive. Data changes could give a similar outcome. Under data skew, non-updated statistics or other cost model limits, data changes could turn a SS (search space) point where the costing was accurate into one harder to estimate. This would become visible as a sudden (for an upgrade or massive data change) or gradual (for ongoing data changes) metrics shift. It is desirable to detect such metrics shifts and invalidate the parts of the learning AP that are affected by it. The candidate plans would be useful here. The system also adjusts the learning AP based on how the current best AP performs. Currently, if the performance of a current best AP degrades more than 20%, all APs are put back into the candidate plan status.

Finally, the schema changes that are relevant to a learning AP are:

dropping an index creating an index dropping an index then recreating another (possibly different) index with the same name.

Creating an index is easy and will potentially give a new best plan. When such a new plan (based on the new index) is selected, its AP enters the competition, first as a candidate AP, then as either of the best AP or a bad AP. Dropping an index is an issue only when it is part of the best AP; the attempt to apply that AP fails. In such a case, the system could remove it (i.e., everything goes back into the candidate status). APs in the candidate sections will not see the dropping of one of their underlying indexes; they simply will not be executed anymore. The LRU replacement rule through relative frequency of execution will slowly discard them. Dropping and recreating an index with the same name has a less clear-cut outcome. If an AP is illegal with the new index (for instance as a MJ (merge join) relying on an ordering that the new index does not provide), the outcome is similar to dropping an index. If an AP is still legal but the metrics are quite different, the scenario is like the data set change. If the metrics are similar, there is no change. Hence, this scenario introduces no new behavior. For all the above invalidation scenarios, it is desirable to go through the legacy (basic_optimization) plan generation again to pick up the pre-upgrade (i.e., pre-150) best plan.

7. Query Metrics and the Auto Query Tuning Mode

Server functionality is added to filter query metrics. The filtering may be applied to the learning AP objects too. Users are advised to remove the filtering to avoid any effect of the filtering on the learning optimizer. If the filtering is specified in such a way that only metrics for the expensive plan are saved, it is likely the learning optimizer will always use the basic_optimization plan generation for a "trivial" query (due to the missing of any learning AP object for the query).

(a) METRICS ON, AUTO QUERY TUNING ON

Query metrics and learning object metrics are aggregated separately. The system view "sysquerymetrics" displays all metrics entries, without any aggregation, implying a double update to the sysqueryplans catalog when both modes are on. It allows metrics to be collected for a small window, independent of whether auto query tuning is on or off. An alternative is to just update the learning object, and have sysquerymetrics aggregate all the metrics for that query text. However, this makes the more common usage scenario of gathering metrics on a window of execution different from the auto query tuning window. In the currently preferred embodiment, a double update is applied, since this is easy to manage and would likely not be a common scenario that both options are always on.

(b) METRICS ON, AUTO QUERY TUNING OFF

This option causes the metrics entry to always be updated, even if there is a learning object which has an entry for the current plan being executed.

8. Statement Cache/Stored Procedure Cache and the Auto Query Tuning Mode

Use of statement cache/stored procedure cache may lead to bypassing of the search engine altogether. But at the end of execution of each query, one should still go through the candidate plan phase. After "query tuning plan executions" number of executions, it is desirable to always invalidate the cached plan in the statement cache at the end of execution, but delay the decision of whether it is a bad plan to the next optimization. Since one has no way of invalidating a single query plan within a stored procedure cached plan, the preferred embodiment does not "invalidate" the stored procedure cache; no recompilation will happen for the next run of the stored procedure. However, if another instance of the stored procedure is compiled due to concurrent activity, or the stored procedure is recompiled for other reasons, then the learning activity will take place. The current best learning AP elapsed time should be kept during execution, so that when a particular plan execution instance has a much better/worse metrics compared to the best plan, the system can immediately invalidate the cached plan in the statement cache without going through the whole candidate phase.

Since auto query tuning could be turned on for a session, scenarios may exist in which a statement cache entry or stored procedure was compiled without an auto query tuning object created. If the auto query tuning session executed one of these objects, then it would be possible that a "bad plan" is executed. Part of statement cache lookup is to look for an entry which was created with a query tuning object, or else a compilation needs to be made in order to create a learning object. Likewise, in a stored procedure, if a query plan was not created with a learning object, and the current session is in auto query tuning mode, then a recompilation is needed to create/use a learning object to ensure that a bad plan is not used. If a non auto query tuning session executed a cached plan created by an auto query tuning session, then the plan can be executed, with any auto query tuning actions to save metrics and complete training be used.

9. Aborted Query Execution and Auto Query Tuning Mode

If the query plan is aborted in the execution engine, then the current plan is marked as a bad plan if the metrics indicate that the plan is worse than the current best plan. This requires the execution engine to be able to record the partial "plancost" information even when the execution is aborted. For the auto query tuning feature, only partial elapsed time is needed.

10. Plan Hints/Partial AP and Auto Query Tuning Mode

The legacy hints are ideally stripped away from the query text prior to saving the Abstract Plan. This allows the customer to force a plan with simpler legacy hints that has the desirable performance behavior, and then instances of this query text will be recognized without requiring the application to be modified with query hints. Similarly, partial hints introduced by an explicit "plan phrase" are ideally stripped to avoid requiring application changes. This feature allows manual DBA intervention to specify a "best" plan candidate if necessary (i.e., neither legacy mode or the auto query tuning mode would ever reach such a plan candidate automatically).

When auto query tuning mode is active, it takes precedence over Abstract Plans, partial hints and set options when deciding the final execution plan, i.e., if the resultant plan from the search engine is in the bad plan list, then the system would ignore it and use the current best plan. This means that even a full Abstract Plan could be ignored, if the learning object indicates this is the best course. Auto query tuning mode must be off, or the "plan off" hint must be used if alternative behavior is desired.

11. Internal SQL's AP and Auto Query Tuning Mode

Some internal SQL such as those generated by the AMC (alter table modify column) code path specifies its intended plan using AP. In order not to interfere with the internal SQL, the learning optimizer mode is automatically off for internal SQL.

12. Search Engine Timeout and Auto Query Tuning Mode

The behavior of optimizer timeout is changed to use the actual elapsed time as a metric for the current optimization timeout only if an existing best plan is available, to eliminate the compilation regression for some queries with bad estimates. Thus, a timeout of "10" means that if the elapsed time average metric for the previous optimization was 5 seconds then optimization should timeout after 0.5 seconds. This timeout behavior should not be used if there was no previous best plan in sysqueryplans or if there was no metric associated with the previous best plan.

13. Manual Legacy Optimizer Mode and Auto Query Tuning Mode

In order to involve minimum DBA intervention for the auto query tuning functionality, the learning optimizer automates the entire process including invoking the legacy optimizer (basic_optimization plan generation) to prime the best plan by default. This involves the following steps:

If an Abstract Plan is not available, then use the legacy optimizer to create a plan which will execute and save some metrics, i.e., provide an upgrade baseline.

If an Abstract Plan is available, then assume it is a baseline and use it to prime the search engine, and then look for a better plan using the existing best plan, if the new plan is found to be marked as a bad plan.

The advantage is that the legacy optimizer is not exposed, allowing use of the advantages of the upgraded (new) optimizer, while still mitigating upgrade pain points. The disadvantage of collapsing both modes would be that there might be some misleading variance in query metrics gathered due to system issues. In other words, legacy mode could be used to establish a baseline until all system load variances have stabilized. A combined mode could result in a legacy mode plan being marked as expensive (due to a transient system issue) and pre-empted by a poorer new optimizer plan. The candidate plan feature described above addresses this. As discussed previously, a session setting command is introduced to manually activate the legacy mode so that DBA could have option to "push" a legacy optimizer plan into the learning optimizer at any time. If the legacy optimizer mode is activated manually, then the learning optimizer behavior would be to exit the search engine with the legacy plan, but still check the best plan, and bad plans in order to decide which plan to execute, i.e., the learning optimizer mode will override the manual legacy optimizer mode if it is determined that a bad plan was selected.

14. Procedure Cache Usage Threshold and Auto Query Tuning Mode

A new threshold for procedure cache usage by the optimizer is introduced, but is only used in auto query tuning mode when a previous best plan with metrics is available. If the optimizer procedure cache threshold is exceeded, then the current best plan found is used. There still may be additional procedure cache used by code generation, and there may be an immediate exit from the search engine if the prep phase consumes an abnormal amount of procedure cache. This feature can use the learning optimizer to limit the procedure cache usage, and still provide a baseline of performance, while looking for better plans. It may be argued that the procedure cache threshold should be used in all cases, but this may cause problems if there is an immediate exit from the search engine without any previous best plan being available for priming. The max resource granularity configuration parameter will be used when the procedure cache threshold is enabled for the learning optimizer.

15. Usage Scenarios

The optimizer uses the legacy (basic_optimization) plan generation automatically along with the "auto query tuning" to capture legacy plans and query metrics, to establish a baseline. This initial invocation of auto query tuning mode only captures plans and metrics as produced by the legacy optimizer. After that, the optimizer uses upgrade (new) functionality to improve the baseline. Based on the current results of different benchmarks, it would also be worthwhile to use each of the optimization goals for a sufficient period of time to further improve the baseline, subject to the caveat that initial executions after invoking a new goal could result in slower system behavior, even requiring terminating a query execution in some extreme cases.

During upgrade, one main question is to find the plans that run more slowly upon upgrade to the new version (e.g., ASE 15.0). Maintained learning objects (APs and metrics) address this question. Any bad plan in the learning object would be the union of:

1. query plans that have regressed from pre-15.0

These are the query plans for which the "basic_optimization" legacy plan is still a good plan and for which a bad plan exists in the learning object.

2. query plans from pre-15.0 that have been improved

A new system stored procedure sp_query_tuning is provided to show both of them.

Another salient point is that if auto query tuning has the performance such that it can be run in production, then the customer may not really care that bad plans exist if the system has automatically avoided them. However, if auto query tuning has a significant performance impact, so that it could only be used in a diagnostic window, then the above information could be a useful tool to determine the queries that have regressed.

The learning optimizer is a solution that leverages AP technology to avoid regressions by maintaining a base line. The end result is that customer will look forward to upgrades, since the baseline should be maintained with some improvements based on incremental changes to the optimizer.

Configuration

New configuration parameters are introduced to turn the learning optimizer on/off at the server level, session level, and query level.

1. Auto Query Tuning Mode Server Level sp_configure "auto query tuning", 1/0

The server configuration parameter applies to all queries in the server. Queries that are cached in the statement cache or stored procedures that are cached will not be recompiled. Default behavior is 0 (i.e., off).

2. Auto Query Tuning Mode at Session Level set auto_query_tuning on/off

The SET command applies to all queries compiled by this session, but does not recompile queries looked up in the statement cache or stored procedures that are already cached. Default behavior is off.

3. Query Tuning Memory Limit at Server Level sp_configure "query tuning mem limit", 1/0

The server configuration parameter (using the max resource granularity fraction for procedure cache) applies to all queries in the server, whether or not the "auto query tuning" mode is enabled and a baseline plan exists for the respective query. If the procedure cache used to compile a query exceeds the max resource granularity percentage, then the optimization is stopped and the current best plan is used (recall that the optimizer was primed with the baseline plan). Default behavior is 1 (i.e., on).

4. Query Tuning Time Limit at Server Level sp_configure "query tuning time limit", 1/0

The server configuration parameter (using the "optimization timeout limit" or "sproc optimize timeout limit" fraction) applies to all queries in the server, if the "auto query tuning" mode is enabled and a baseline plan exists for the respective query. If the actual compilation time (i.e., optimizer CPU ticks are not used here) exceeds the actual execution time of the baseline plan, then the optimization stops, and the current best plan is used (recall that the optimizer was primed with the baseline plan). Default behavior is 1 (i.e., on).

5. Query Tuning Executions Server Level
sp_configure "query tuning plan executions", n The server configuration parameter value determines how many executions are needed for a learning AP plan to stay in the candidate mode before being labeled based on its aggregated metrics. Default behavior is 3, i.e., 3 executions before it can be determined if this plan is good or bad.

6. Query Tuning Memory Limit at Session Level
set query_tuning_mem_limit on/off

The SET command applies to all queries (using the max resource granularity fraction for procedure cache) compiled by this session, if the "auto query tuning" mode is enabled and baseline plan exists for the respective query. If the procedure cache used to compile this query exceeds the max resource granularity percentage, then the optimization is stopped and the current best plan is used (remember that the optimizer was primed with the baseline plan). Default behavior is on.

7. Query Tuning Time Limit at Session Level
set query_tuning_time_limit on/off

The SET command applies to all queries (using the "optimization timeout limit" or "sproc optimize timeout limit" fraction) compiled by this session, if the "auto query tuning" mode is enabled and a baseline plan exists for the respective query. If the actual compilation time (i.e., optimizer CPU ticks are not used here) exceeds the actual execution time of the baseline plan, then the optimization stops, and the current best plan is used (recall that the optimizer was primed with the baseline plan). Default behavior is on.

8. Legacy at Session Level
set basic_optimization on/off

The SET command manually activates the legacy mode for the current session. Default behavior is off, i.e., server will choose whether to use legacy mode for a query automatically.

9. Auto Query Tuning at Query Level
(use auto_query_tuning off)

This Abstract Plan hint will turn off auto query tuning at the query level, for this query only, if it was enabled at the session or server level.

Information Reporting Functionality/Error Recovery

Optimizer diagnostics output is enhanced to show the learning process, including the use of legacy optimizer plan (possible unsuccessful attempt message), known bad plan, and so forth.

A new system stored procedure is provided to report learning optimizer related information:

sp_query_tuning ['command'[, '@arg1'[, '@arg2' [, '@arg3']]]]

The 'command' allows the following:
help—get help on a command
The syntax is sp_query_tuning 'help'[, 'command']
flush—flush all learning metrics from memory to system tables
The syntax is sp_query_tuning 'flush'
drop—drop a learning query or a learning ID or a group of learning queries
The syntax is sp_query_tuning 'drop', '@gid'[, '@id' [, '@lrnid']]
show—display the learning status in each learning group
The syntax is sp_query_tuning 'show', 'ase125_better_plan'|'ase15_better_plan'|'learning_query'|'aborted_learning_plan'
sp_query_tuning show, ase125_better_plan identifies the queries whose best plan is the legacy mode plan and there is worse plan from non-legacy mode. sp_query_tuning flush flushes all aggregated metrics in memory to the system catalog. The aggregated metrics for all statements in memory are zeroed out. Because the learning metrics and the existing query metrics share the same metrics capture mechanism. This command will cause any existing query metrics to be "flushed" too. sp_query_tuning drop, <gid>, <id>, <lrnid> causes one specific learning AP and its associated metrics to be removed from the system catalog. sp_query_tuning drop, <gid>, <id> causes one specific learning object (including all its learning APs and associated metrics) to be removed from the system catalog. sp_query_tuning drop, <gid> drops all learning objects for a particular group.

Detailed Operation

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

Figure 4:
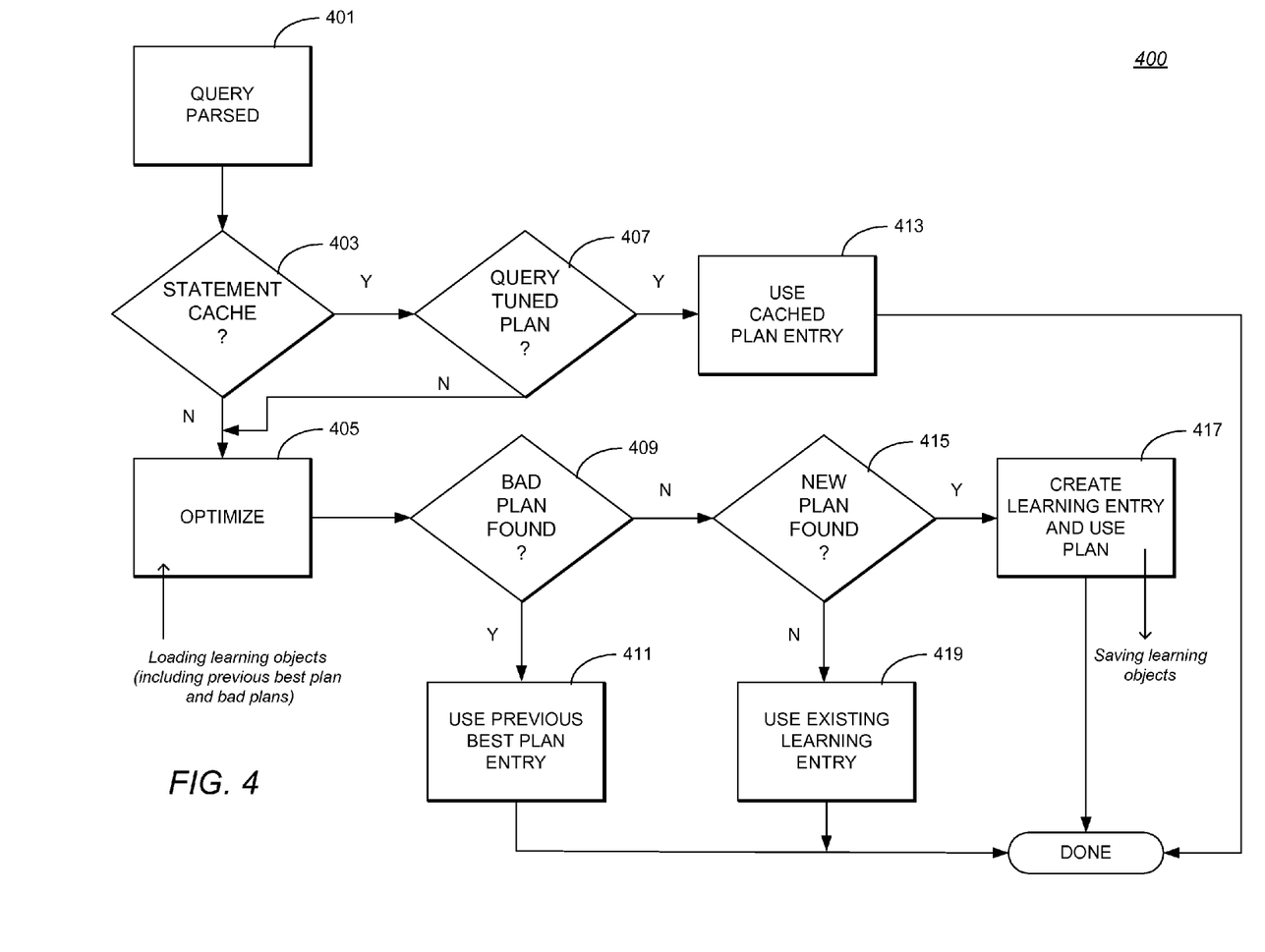
FIG. 4 is a high-level flowchart illustrating a methodology for query parsing and optimization when auto query tuning is activated.

FIG. 4 is a high-level flowchart illustrating a methodology 400 for query parsing and optimization when auto query tuning is activated. The method commences with the parsing of a query (i.e., SQL query string) at step 401, the query typically having been received by the database system from a database client. (This step is of course a pre-existing step where the query is prepared for processing by the system.) Before the parsed query is processed (further), the database system first consults a statement cache at step 403 to determine whether the parsed query has been encountered and processed before. In the event that the query has in fact been processed before (i.e., "yes" at step 403), the method proceeds to step 407 to determine whether the query has ever been tuned before. Specifically, the system determines whether the query has been executed a sufficient number of times (e.g., three times, or per user-configurable setting) so that sufficient query metrics have been collected for the query (in particular, for the underlying query plan created for the query). For example, if a given query were only executed once, the collected metrics may not be very reliable (for predicting future execution characteristics). In the case that the query has been tuned (i.e., "yes" at step 407), the system may simply proceed to use the cached plan entry (i.e., cached AP that has been tuned), as indicated at step 413, for executing the query.

In the event that a query is not in the statement cache (i.e., "no" at step 403) or the query (plan) has not been tuned (i.e., "no" at step 407), the method proceeds to step 405 to optimize the query. Here, the query enters the optimization phase, where the database system selects the best query plan given the current state of statistics (query metrics) and state of the system. Once the system finds what it considers to be the current best plan (ignoring for the moment any auto query tuning features), the system uses that best plan to proceed to the auto query tuning decision process of the method.

As an optional enhancement of this step, the optimizer may be "primed" by using the learning object as a starting point for the optimization. Since the database is a constantly evolving environment (e.g., with changing statistics, changing table size, and so forth), it is advantageous to start with the best plan presently known and then try to improve upon it. By using the previous best plan as a starting point, the system can typically complete the optimization phase more quickly.

The auto query tuning decision process includes the following steps. At step 409, the method determines whether a "bad" plan was found. Internally, the database system consults the query's learning object to determine whether the current optimized plan has in fact been previously found during prior execution to be suboptimal (i.e., poor performance or execution time). This may occur when a plan appears optimized based on the database system's mathematical model (e.g., cost estimate) but in fact actual execution reveals query metrics that show the plan to not be a good plan (i.e., it has poor performance when compared to other plan(s) in the learning object). It is important to recognize at this juncture in the method that the database system is not attempting to use feedback to improve future plans (as is conventionally done), but is instead avoiding bad plans and thereby avoid regression. If a bad plan is found at step 409, the method proceeds to step 411 to use the previous best plan entry (i.e., the previous best plan in the learning object). Here, the system simply uses/executes what it knows to be a better query plan (listed in the learning object).

If a "bad" plan is not found (i.e., "no" at step 409), the method proceeds to step 415 to determine whether a new plan has been found. If a new plan is found (i.e., "yes" at step 415), the method enters a training phase. At step 417, the method uses the existing (newly found) plan to create a learning entry. Here, the plan is persistently recorded in a catalog of plans in the learning object. At this point, the system does not necessarily know whether the plan is "good" or "bad." However the creation of a learning entry signifies that the plan is "untuned" and will enter a learning mode. Now, the plan is cached and essentially tested or trained to determine its actual execution elapsed time. The plan is executed enough times (default being three times) so that the system can determine whether the plan is good or bad. Once the plan is trained, it becomes a "tuned" plan that may be compared to other plans in the query's learning object. If a new plan is not found (i.e., "no" at step 415), the method proceeds to step 419 to use the existing best plan (i.e., as reflected by the previous best plan entry in the learning object).

Figure 5:
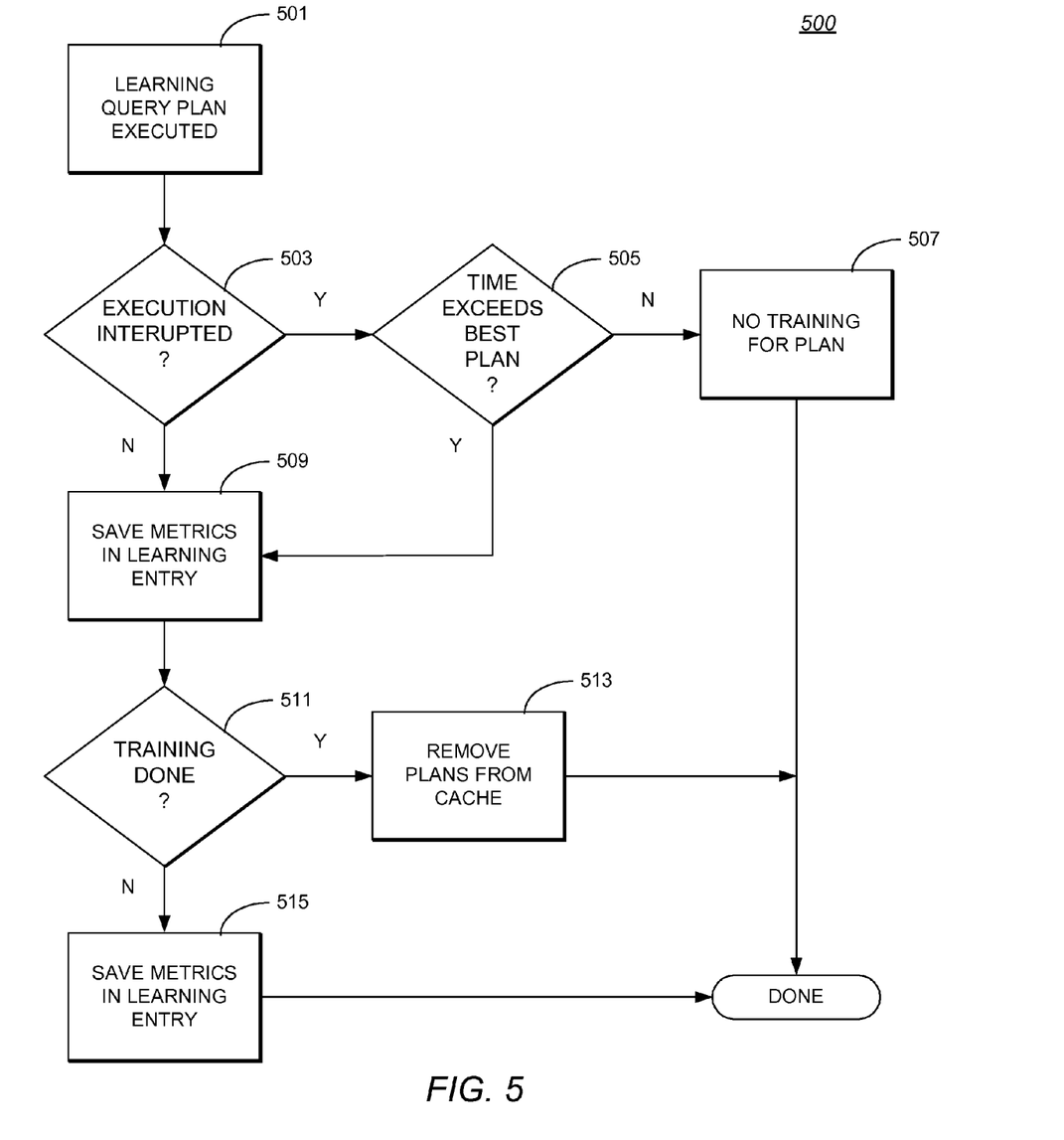
FIG. 5 is a high-level flowchart illustrating a methodology for execution of a query plan when auto query tuning is activated.

FIG. 5 is a high-level flowchart illustrating a methodology 500 for execution of a query plan when auto query tuning is activated. The flowchart demonstrates how training of a plan occurs, as training involves executing a plan a prescribed or configured minimum number of times. This allows the system to capture execution metrics representing on average how a given plan will perform. Note that if execution metrics from only one execution run were used, the observed metrics may be skewed by irrelevant factors, such as the computer system being temporarily held up by some other process. The method commences at step 501 with execution of the learning query plan. During this execution, it is possible that the execution may be interrupted, which is tested at step 503. Execution may be interrupted for various reasons. For example, the database administrator may abort the current plan (e.g., because it is running too long) and try a different plan. In that scenario, execution is "incomplete" but the system nevertheless tracks the query plan's metrics. Specifically, the system tests whether the time that the plan was executing exceeded the previous best plan, as indicated at step 505. If the tested plan's execution time does exceed the current best plan (i.e., "yes" at step 505), then the plan's metrics are saved (in the learning entry), as shown at step 509. The reason this is done is as follows. Even with a partial (i.e., incomplete) execution, the plan is now known to be worse then the previous best plan, and therefore the database system will want to avoid that plan if it should reappear (i.e., during future execution of the query). Thus, notwithstanding the fact that the plan's execution was incomplete, the interruption of execution still becomes a learning event, for understanding whether the execution time exceeds that of the previous best plan. On the other hand, if the execution time does not exceed the previous best plan (i.e., "no" at step 505), there may have been an interruption for some other reason. In that case, the method proceeds to step 507 where it does not update the training object at all. Instead, the interruption is treated as an invalid execution (i.e., interruption or termination for some reason other than elapsed time).

If the execution is not interrupted (i.e., "no" at step 503) or execution was interrupted and the plan's time exceeded the previous best plan (i.e., "yes" both at step 503 and 505), the method proceeds to step 509 to save the plan's execution metrics in the learning entry. The learning entry includes an execution "count" field. Each time the plan is executed (during learning mode) the count is incremented by 1, until the count reaches a "training (done) count" (e.g., 3), which indicates that training is done. This count is tested at step 511. If training is not done (i.e., "no" at step 511), the method proceeds to save the plan's metrics in the learning entry, as indicated at step 515. Once training is done (i.e., "yes" at step 511), however, the method proceeds to remove the query's plans (i.e., learning plans) from cache, as indicated at step 513. For purposes of modularity (i.e., to reduce amount of underlying programming code), the database system essentially flushes the plans from cache after the training limit has been reached so that upon subsequent execution the query will again reenter the optimization phase to force the system to determine whether the query's last-executed plan is a good or bad plan. If the last-executed plan is, upon subsequent execution, determined to have the best execution time, it will be deemed to be the current best plan and may therefore be retained in the cache as the current best plan. The best plan may be retained in the cache indefinitely as a "trained" plan until some event (e.g., update statistics) causes the cache to be flushed. On the other hand, if the plan is bad, the system will simply avoid the plan upon future compilation/execution of the query, whereupon the last best plan becomes the "trained" plan retained in the cache.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a database system having an optimizer for selecting a query plan for executing a database query, a method for automatically tuning query performance to prevent query performance regression that may occur during upgrade of the database system from a prior version to a new version, the method comprising:

in response to receiving a given database query for execution, specifying a query plan generated by the prior version's optimizer as a baseline best plan for executing the given database query;

generating at least one new query plan using the new version's optimizer;

learning performance for each new query plan generated by recording corresponding query execution metrics;

if a given new query plan is observed to have better performance than the best plan previously specified, specifying that given new query plan to be the best plan for executing the given database query;

if a given new query plan is observed to have worse performance than the best plan previously specified, specifying that given new query plan to be a bad plan to be avoided in the future; and automatically tuning future execution of the given database query by using the query plan that the system learned was the best plan.

2. The method of claim 1, wherein the method automatically tunes execution of the given database query without user intervention.

3. The method of claim 1, wherein the query plan generated by the prior version's optimizer is used for future execution of the given database query in response to determining that no new query plan is observed to have better performance.

4. The method of claim 1, wherein said generating step includes:

avoiding using any new query plan generated that has been previously identified to be a bad plan.

5. The method of claim 1, wherein said query execution metrics include time required for the database system to complete execution of a given query plan.

6. The method of claim 1, wherein query execution metrics for each new query plan generated is stored in an associated learning object.

7. The method of claim 6, wherein the learning object indicates whether its associated query plan has been tuned.

8. The method of claim 6, wherein the learning object is associated with a particular database query based on text that comprises the query.

9. The method of claim 1, wherein the learning step includes:

learning performance for each new query plan generated by recording corresponding query execution metrics a certain number of times.

10. The method of claim 9, wherein the certain number of times is user configurable.

11. A database system having an automatically tuning optimizer for selecting a query plan for executing a database query such that query performance regression is avoided during upgrade of the database system from a prior version to a new version, the system comprising:

a computer having a processor and memory;

a query plan generated by the prior version's optimizer, which serves as a baseline best plan for executing a given database query;

at least one new query plan generated by the new version's optimizer;

a learning object associated with each query plan for tracking corresponding query execution metrics, whereby the system may learn which new query plan, if any, is the best plan for executing the given database query and which new query plans are bad plans to be avoided in the future; and a module for automatically tuning future execution of the given database query, based on which query plan the system learned was the best plan.

12. The system of claim 11, wherein the system automatically tunes execution of the given database query without user intervention.

13. The system of claim 11, wherein the query plan generated by the prior version's optimizer is used for future execution of the given database query in response to determining that no new query plan is observed to have better performance.

14. The system of claim 11, wherein the system automatically avoids using any new query plan generated that has been previously identified to be a bad plan.

15. The system of claim 11, wherein said query execution metrics include time required for the system to complete execution of a given query plan.

16. The system of claim 11, wherein each learning object indicates whether its associated query plan has been tuned.

17. The system of claim 11, wherein each learning object is associated with a particular database query based on text that comprises the query.

18. The system of claim 11, wherein each learning object records corresponding query execution metrics observed over a certain number of executions.

19. The system of claim 18, wherein the certain number of executions is user configurable.

20. The system of claim 18, wherein the certain number of executions is equal to three.

21. In a database system having an optimizer for selecting a query plan for executing a database query, a method for tuning query performance to prevent query performance regression, the method comprising:

establishing a baseline best plan for executing the database query;

generating a new query plan for executing the database query;

if the new query plan has not been previously identified as a bad plan, monitoring performance of the new query plan;

if the new query plan has better performance than the best plan previously established, establishing the new query plan to be the best plan for executing the given database query;

if the new query plan does not have better performance than the best plan previously established, establishing the new query plan to be a bad plan; and performing subsequent executions of the database query using the query plan that the system established was the best plan.

22. The method of claim 21, wherein the method automatically tunes query performance without user intervention.

23. The method of claim 21, wherein the baseline best plan is used for future execution of the given database query in, response to determining that no new query plan is observed to have better performance.

24. The method of claim 21, wherein said monitoring performance step includes monitoring time required for the system to complete execution of the new query plan being monitored.

25. The method of claim 21, wherein said monitoring performance step includes storing execution metrics in a learning object associated with the new query plan, said learning object including information indicating whether the new query plan has been tuned yet.

* * * * *